3,466,307
PROCESS FOR PREPARING CARBOXYLIC ACID THIOANHYDRIDES

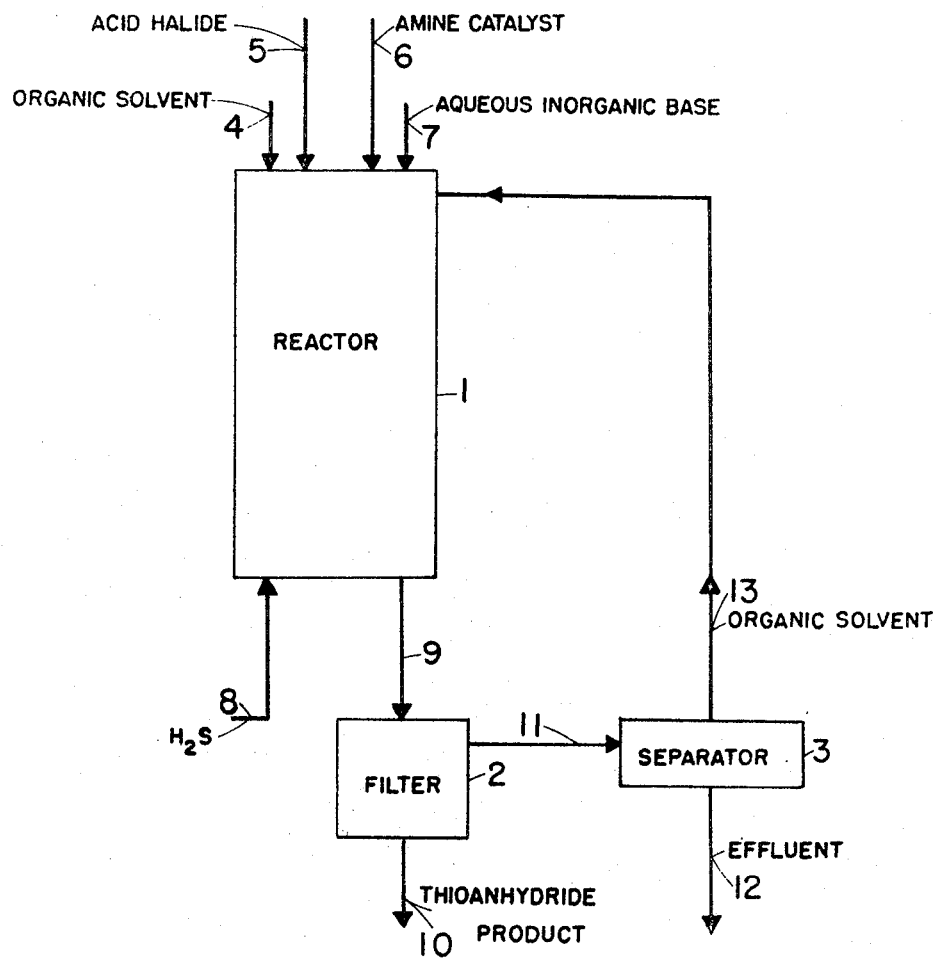

Walter Stamm, Tarrytown, Carl C. Greco, Bronx, and Thomas M. Beck, Hastings-on-Hudson, N.Y., assignors to Stauffer Chemical Company, New York, N.Y., a corporation of Delaware
Filed Oct. 13, 1967, Ser. No. 675,247
Int. Cl. C07c *153/00;* C07b *5/02*
U.S. Cl. 260—399                                  12 Claims

ABSTRACT OF THE DISCLOSURE

A process for preparing carboxylic acid thioanhydrides of the formula:

(1)            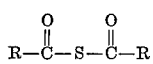

wherein the groups represented by R are aliphatic radicals of from 4 to 23 carbon atoms. The process comprises reacting at least one aliphatic acid halide of the formula:

(2)            

wherein R is as previously defined and X is a halogen, with hydrogen sulfide and a hydrogen halide acceptor. The reaction is conducted in a two-phase aqueous-organic solvent system, which organic solvent phase is at least partly immiscible with the aqueous phase but substantially miscible with the aliphatic acid halide reactant.

---

This invention relates to organic acid thioanhydrides, and more particularly to a process for preparing aliphatic carboxylic acid thioanhydrides by the reaction of aliphatic acid halides with hydrogen sulfide in a two-phase aqueous-organic solvent system.

Organic thioanhydrides are known and a process for preparing the thioanhydrides of aromatic carboxylic acids is disclosed in Blake U.S. Patent No. 2,331,650, issued Oct. 12, 1943. To applicants' knowledge, however, there have been no processes heretofore for the preparation of the middle and higher fatty acid thioanhydrides in good yields. One of the difficulties encountered when aliphatic acid halides are reacted with hydrogen sulfide in an aqueous medium is that the acid halides are hydrolyzed by the water. When an organic solvent is employed, however, to contain the acid halide reactant, recovery of the thioanhydride product in good yield has not been possible. In accordance with the present invention, it has been found that the aforesaid difficulties and others can be obviated by reacting the aliphatic carboxylic acid halide with hydrogen sulfide and a hydrogen halide acceptor in a two-phase aqueous-organic solvent system and preferably in the presence of an organic tertiary amine catalyst.

The reaction can be illustrated by the following diagram wherein R and RR are aliphatic hydrocarbon radicals of from 4 to 26 carbon atoms and can be the same or different, and X is a halogen.

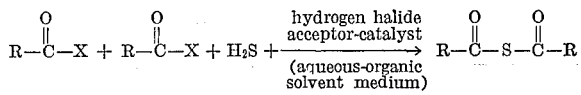

The aliphatic hydrocarbon radicals represented by R and R can be saturated or unsaturated and can be substituted with any relatively inert radical. Examples of suitable saturated radicals include: butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl and heneicosyl. Examples of suitable unsaturated radicals include: ethenyl, propenyl, butenyl, pentenyl, hexenyl, heptenyl, octenyl, nonenyl, decenyl, hexadecenyl and eicosenyl. Examples of relatively inert radicals include halogens such as fluorine, chlorine and bromine, as well as amino and nitro groups.

Quite surprisingly when the preferred solvents are employed, an excess of the hydrogen sulfide reactant can be used without any significant formation of by-products so that it is not required to carefully control the hydrogen sulfide addition. Moreover, it is desirable to employ an excess of hydrogen sulfide because it produces a more complete and rapid reaction. Other advantages will be apparent from the following text and the examples.

The two-phase aqueous-organic medium consists of an aqueous phase and an organic solvent in which the acid halide is substantially soluble but which solvent is at least partly immiscible with the aqueous phase. In a preferred aspect a solvent is employed in which the thioanhydride product is insoluble so that the product precipitates upon formation. The preferred solvents readily adapt the process of the invention to a continuous process since the product can be easily removed and the solvent recycled for further use.

In a preferred embodiment, the process of the invention is conducted continuously in accordance with the flow diagram appendant as FIGURE 1. It is to be understood that the flow diagram is diagrammatic only in that it may be altered in many respects by those skilled in the art and yet remain within the intended scope of the invention.

Referring to the drawing, organic solvent from line 4, acid halide from line 5, amine catalyst from line 6, aqueous-inorganic base (hydrogen halide acceptor) from line 7, and hydrogen sulfide from line 8, are passed into reactor 1. Reactor 1 is equipped with agitation means and is preferably jacketed for receiving water or other coolant. Reactor 1 is preferably maintained at atmospheric pressure and at a temperature from about —20° C. to about 45° C. The reaction products are passed from reactor 1 through line 9 into filter 2, where the reaction products are water washed. The thioanhydride product is passed through line 10 and collected for drying and further purification, if desired. The solvent containing unreacted acid halide and by-products is passed through line 11 to separator 3. The aqueous effluent is discarded at line 12 and the organic solvent containing acid halide is passed through line 13 to reactor 1.

Organic solvents which can be employed include the lower saturated alkanes of from 3 to 20 carbon atoms, halogenated saturated alkanes of from 4 to 10 carbon atoms, and aromatic hydrocarbons of from 6 to 20 carbon atoms. Examples of suitable alkane solvents include propane, butane, pentane, heptane, hexane, nonane, decane and dodecane. Alicyclics may also be employed such as cyclopropane, cyclobutane, cyclopentane and cyclohexane. Examples of suitable halogenated alkanes which include both chloro- and fluoro-substituted are: ethyl chloride and dichlorodifluoromethane. Examples of suitable aromatic hydrocarbons include benzene, toluene, xylene, mesitylene, ethyl benzene and ethyl toluene.

The alkanes are the preferred solvents for the reason that the carboxylic acid thioanhydride product is only very slightly soluble in these solvents and will, therefore, precipitate, leaving any unreacted acid halide in the solvent. With these preferred solvents one can easily conduct the invention process continuously. In addition, almost no by-product acid is formed with the use of these preferred solvents because the hydrogen sulfide reactant cannot react with the thioanhydride reaction product since it precipitates from solution on forming.

The organic amines which can be employed as the catalyst are those amines which are at least partly soluble in the reaction medium. Examples of suitable amines for use in this invention include trimethyl amine, triethyl amine, dimethyl aniline, pyridine, piperidine, picoline and quinoline.

The hydrogen halide acceptors which can be employed in the invention process are the water soluble inorganic bases, such as the carbonates and bicarbonates of the Group I and Group II metals, ammonium carbonate and ammonia. Representative examples of suitable hydrogen halide acceptors include: potassium carbonate, potassium bicarbonate, sodium carbonate, sodium bicarbonate, ammonium carbonate, lithium carbonate, magnesium carbonate, calcium carbonate and ammonia.

Acid halides which can be employed in the invention process are the chlorides, bromides and fluorides of substituted and unsubstituted medium chain aliphatic carboxylic acids having from 5 to 27 carbon atoms. For economic reasons the chlorides are, of course, preferred. Representative examples include: isovaleroyl chloride, caproyl chloride, neoheptanoyl chloride, n-heptanoyl chloride, pelargonic acid chloride, undecylenic acid chloride, ω-bromoundecanoyl chloride, 2-nitro-hexanoyl chloride, lauroyl chloride, palmitoyl chloride, cyclohexyl carboxylic acid chloride, stearoyl chloride, tetrachlorostearoyl chloride, α-chlorostearoyl chloride, α-thioethylstearoyl chloride, oleoyl chloride, 9,10-dibromostearoyl chloride, behenic acid chloride. Also mixtures of aliphatic acid chlorides and mixtures of substituted acid chlorides can be used, e.g., coconut acid chlorides and tallow acid chlorides. The hydrocarbon moieties R and R can be substituted with any relatively inert radical such as fluorine, chlorine, bromine, nitro or amino groups. Acetylenic unsaturated carboxylic acid halides can also be employed in the process of the invention, such as, for example, the chlorides of amylpropiolic acid, palmitolic acid, stearolic acid and behenolic acid. The hydrocarbon radicals can also contain ether or thioether linkages.

Dicarboxylic acid halides can also be employed. They can be represented by the formula:

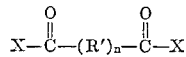

wherein X is as previously defined, R' is a divalent radical of from 1 to 10 carbon atoms, and $n$ is an integer of from 0 to 1. Both saturated and unsaturated acid halides can be employed. Examples of suitable saturated compounds include the acid halides of: oxalic, malonic, succinic, glutaric, adipic, pimelic, suberic, azelaic, sebacic, and brassic. Examples of suitable unsaturated compounds include the acid halides of fumaric, maleic, glutaconic, allylmalonic, tetraconic and xeronic. Mixtures of both saturated and unsaturated mono and dicarboxylic acid halides can be employed if desired. While the dicarboxylic acid thioanhydrides have many uses, they are particularly useful as rubber stabilizers.

Although the proportions of reactants are not critical, they should generally be present in stoichiometric amounts of about 0.5 mole hydrogen sulfide per mole of acid halide and mole equivalent of hydrogen halide acceptor. It is preferred, however, that an excess of hydrogen sulfide be employed of from about 100% to about 300% in order to obtain a quick reaction. The quantity of solvent should be sufficient to contain in solution the acid halide generated in the reaction and will generally be present in a ratio of from about 2 to about 6 volumes per one volume of water. The ratio of solvent to water is not critical, however, and may be as great as 1:50. The amine catalyst which may serve as a hydrogen chloride transfer agent should, if used, be present in an amount of at least about 0.5% based on the weight of the organic acid halide reactant. It is preferred, however, that the catalyst be present in an amount of from about 1% to about 5% in order to achieve maximum yields.

The temperature of the reaction should be sufficiently high to prevent the reaction mixture from becoming viscous and will generally be from about $-20°$ C. to about $45°$ C. It is preferred, however, that the temperature be maintained between about $0°$ C. and $25°$ C. Although the reaction can be conveniently conducted at the atmospheric pressure, superatmospheric pressures of up to about 2 atmospheres and higher can be employed to advantage with lower alkane solvents such as propane and butane. Normally, however, it will be sufficient and efficacious to conduct the reaction under atmospheric conditions.

In order to avoid formation of undesirable by-products and insufficient reaction, the reaction mixture is agitated and preferably at a vigorous or turbulent rate. When the reaction is complete as evidenced by no further hydrogen sulfide absorption, the product can be recovered by the conventional means such as filtration and can be further purified, if desired, by crystallization, distillation, and the like. When the preferred solvents are used, however, the product will precipitate from solution and can be used for many uses without purification.

The following examples will serve to illustrate the process of the invention and its preferred embodiments.

EXAMPLE 1

To a 3-necked 1-liter glass reaction flask, equipped with a gas inlet tube, dropping funnel, condenser, thermometer and stirrer, are added 23 grams (0.23 mole) of sodium carbonate, 50 cc. of water, and 4 grams of triethylamine. After the sodium carbonate is dissolved, 300 cc. of pentane is added and the mixture cooled to $10°$ C. To this mixture is then added 100 grams (0.46 mole) of lauroyl chloride by way of the dropping funnel, and hydrogen sulfide gas is metered through the mixture at a rate of 1 mole per hour for 2 hours which is a total of 71 grams (2.1 moles) of hydrogen sulfide. The reaction mixture is stirred vigorously for an hour at $10°$ C. and the reaction is terminated. The precipitate containing the desired thiolauric anhydride product is washed with 50 cc. of fresh pentane, then with 200 cc. of water; filtered and dried to constant weight in a vacuum oven. 69 grams (76% yield) of thiolauric anhydride are recovered having a melting point of from $49-51°$ C. Infrared spectra and elemental analysis further confirm the formation of the desired product. The pentane solvent, containing about 16 grams of unreacted lauroyl chloride, is saved for reuse.

EXAMPLES 2-9

The following examples illustrated in table below demonstrate the effectiveness of the amine catalyst, preferred reaction temperature, reaction time and yield of thiolauric anhydride.

In all examples 100 grams (0.46 mole) of lauroyl chloride, 23 grams of sodium carbonate, 300 cc. of pentane and 50 cc. of water were employed. The other conditions insofar as they varied are reported in the table.

TABLE.—PREPARATIONS OF THIOLAURIC ANHYDRIDE

| Example | Conditions | Reaction temp. (° C.) | Reaction time (hrs.) | Yield of TLA, percent | Recovered acid chloride, percent |
|---|---|---|---|---|---|
| 2 | 4% amine cat | −10 | 3 | 68 | 22 |
| 3 | do | 10 | 3 | 77 | 15 |
| 4 | do | 35 | 3 | 30 | |
| 5 | 2% amine cat | 10 | 3 | 75 | 15 |
| 6 | 25% excess of Na₂CO₃ | 10 | 5 | 80 | 13 |
| 7 | No amine cat | 10 | 5 | 55 | 15 |
| 8 | No water used | 10 | 5 | 40 | 15 |
| 9 | Repeat of Ex. 6 | 10 | 5 | 78 | 11 |

Referring now to said table, it can be seen from Example 4 that the reaction temperature should be below room temperature for a sufficient yield even with the presence of a catalyst. Examples 2, 3, 5, 6 and 9 demonstrate the desirability of the reduced temperature of 10° C.; Examples 5 and 7 demonstrate the importance of the amine catalyst for a high product yield; and Example 8 demonstrates the importance of water in the reaction system.

EXAMPLE 10

Thiostearic anhydride

To a 3-necked 5-liter glass reactor equipped with a gas inlet tube, dropping funnel, condenser, thermometer and stirrer are added 97 grams (0.91 mole) of sodium carbonate dissolved in 200 cc. of water. Then 500 cc. of solvent consisting of equal volume proportions of pentane and hexane and 10 grams of triethylamine catalyst are added to this mixture. With vigorous agitation, the reaction flask is cooled to 10° C. At this temperature 500 grams (1.65 moles) of stearoyl chloride are added by way of the dropping funnel and 150 grams (4.4 moles) of hydrogen sulfide by way of the gas inlet tube placed near the bottom of the flask. The addition requires approximately 1.5 hours. The temperature in the reactor is maintained between 10° C. and 15° C. by water cooling.

The addition of hydrogen sulfide (50 grams) is continued for an additional hour after the stearoyl chloride addition is complete. The mixture is then filtered at 10° C. and the white filter cake is washed first with pentane and then water. The product is then filtered and air dried. 435 grams (92% yield) of thiostearic anhydride are recovered having a melting point of 76° C. to 78° C.

EXAMPLE 11

Thiopalmitic anhydride is prepared in accordance with the procedure of Example 10 from palmitoyl chloride, hydrogen sulfide, sodium bicarbonate, pyridine catalyst, and an aqueous-cyclohexane solvent medium.

EXAMPLE 12

Thiomyristic anhydride is prepared in accordance with the procedure of Example 10 employing myristoyl chloride as the aliphatic acid halide.

The following example will serve to illustrate the preferred embodiment of the invention in which the process is conducted continuously.

EXAMPLE 13

To a glass-lined, water-cooled reactor are charged per hour: 9.2 parts of triethylamine catalyst, 1,611 parts of an aqueous sodium carbonate solution (consisting of 1,085 parts water and 626 parts sodium carbonate), 2,398 parts lauroyl chloride 6,200 parts pentane and 450 parts hydrogen sulfide. The reaction mixture is maintained at a temperature of 10° C. and agitated at a rate sufficient that the aqueous and organic solvent phases are maintained in intimate contact. With reference to FIGURE 1, after a residence time in the reactor of one hour, the reaction mixture is passed through line 9 to filter 2, wherein the reaction mixture is washed with 2,500 parts of water. The lauric thioanhydride product is passed through line 10 to be dried to constant weight in a rotary drier. 1,980 parts of thiolauric anhydride are recovered. The filtrate is passed through line 11 to separator 3, wherein the aqueous effluent containing sodium chloride is passed through line 12 and discarded. The pentane solvent containing unreacted lauroyl chloride is recycled through line 13 to reactor 1.

The organic thioanhydrides can be employed to protect a number of polymers against degradation and discoloration due to heating. They are particularly effective in stabilizing the halogen containing hydrocarbon polymers such as polyvinyl chloride, and polyvinylidene chloride. The presence of between about 0.01% and about 10% by weight of the stabilizer compound will be sufficient for most applications, although the preferable range is between about 1% and about 5% on a weight basis. The following examples illustrate the employment of the thioanhydrides as stabilizers.

EXAMPLE 14

A mixed thioanhydride is prepared in accordance with the procedure of Example 10 employing a mixture of acid halides (i.e., 60% lauroyl chloride and 40% myristoyl chloride).

EXAMPLES 15–17

The compounds of 1, 10 and 11 (3 grams each) are blended respectively with 100 grams of polyvinyl chloride resin and 30 grams of dioctyl phthalate plasticizer. Each blend is milled at a temperature of 325° F. Samples of resin are removed from the hot mill at ten minute intervals and examined. All of the samples are white and clear at the end of 50 minutes' milling time.

What is claimed is:

1. Process for preparing aliphatic carboxylic acid thioanhydrides of the formula:

(1) 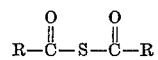

wherein the groups represented by R are aliphatic radicals of from 4 to 23 carbon atoms which comprises reacting at a temperature within the range of between about −20° C. and about 45° C. at least one aliphatic acid halide of the formula:

(2) 

wherein R is as previously defined and X is a halogen, with hydrogen sulfide and a hydrogen halide acceptor selected from the group consisting of Group I and Group II metal carbonates and bicarbonates, ammonium carbonate and ammonia, wherein the reaction is conducted in a two-phase aqueous-organic solvent medium, which organic solvent phase is at least partly immiscible with the aqueous phase but substantially miscible with the aliphatic acid halide reactant.

2. The process of claim 1 wherein the reaction is conducted in the presence of a catalytic amount of an amine catalyst.

3. The process of claim 1 wherein the volume ratio of organic solvent phase to aqueous phase is from about 2:1 to about 6:1.

4. The process of claim 2 wherein the organic solvent is an alkane of from 4 to 20 carbon atoms.

5. The process of claim 2 wherein the acid halide is lauroyl chloride.

6. The process of claim 2 wherein the acid halide is stearoyl chloride.

7. The process of claim 2 wherein the acid halide is palmitoyl chloride.

8. The process of claim 2 wherein the acid halide is myristoyl chloride.

9. A process for preparing carboxylic acid thioanhydrides of the formula:

(1) 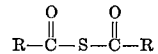

wherein the groups represented by R are aliphatic radicals of from 4 to 23 carbon atoms which comprises passing hydrogen sulfide and at least one aliphatic acid halide of the formula:

(2) 

wherein R is as previously defined and X is a halogen, through a first reaction zone with an amine catalyst and a hydrogen halide acceptor selected from the group consisting of Group I and Group II metal carbonates and bicarbonates, ammonium carbonate and ammonia, at a temperature of between about −20° C. and about 45° C., said reaction zone containing a two-phase aqueous-organic solvent medium in intimate contact which organic solvent phase is at least partly immiscible with the aqueous phase but substantially miscible with the aliphatic acid halide reactant; passing the reaction mixture to a filter zone wherein the thioanhydride product is separated and recovered; passing the filtrate to a separation zone wherein the aqueous effluent is separated and discarded; and recycling the organic solvent medium, containing unreacted aliphatic acid halide to said reaction zone.

10. The process of claim 9 wherein the temperature of the reaction is maintained between about 0° C. and about 25° C.

11. The process of claim 9 wherein the solvent is an alkane of from 4 to 20 carbon atoms.

12. The process of claim 9 wherein the aliphatic acid halide is lauroyl chloride, the organic solvent is an alkane of from 4 to 20 carbon atoms, and the temperature of the reaction is maintained between about 0° C. and about 25° C.

References Cited
UNITED STATES PATENTS 2,639,296   5/1953   Crouch et al. _____ 260—545

OTHER REFERENCES

Sunner et al.: Chemical Abstract 41, 983$^a$ (1947).

DANIEL D. HORWITZ, Primary Examiner

U.S. Cl. X.R.

260—545